United States Patent [19]

Slat

[11] Patent Number: 5,906,285
[45] Date of Patent: May 25, 1999

[54] PLASTIC BLOW MOLDED CONTAINER

[75] Inventor: William A. Slat, Brooklyn, Mich.

[73] Assignee: Plastipak Packaging, Inc., Plymouth, Mich.

[21] Appl. No.: 08/644,748

[22] Filed: May 10, 1996

[51] Int. Cl.⁶ .............................. B65D 1/02; B65D 23/02
[52] U.S. Cl. ........................ 215/12.2; 215/12.1; 215/375
[58] Field of Search .................................. 215/12.1, 12.2, 215/375

[56] References Cited

U.S. PATENT DOCUMENTS

| | | |
|---|---|---|
| 3,717,544 | 2/1973 | Valyl . |
| 3,719,735 | 3/1973 | Valyi . |
| 3,878,282 | 4/1975 | Bonis et al. . |
| 4,067,944 | 1/1978 | Valyi ................................... 264/296 X |
| 4,307,137 | 12/1981 | Ota et al. ............................. 264/513 X |
| 4,381,061 | 4/1983 | Cerny et al. ....................... 215/12.2 X |
| 4,391,861 | 7/1983 | Nilsson .............................. 264/516 X |
| 4,550,043 | 10/1985 | Beck ................................... 215/12.2 X |
| 4,573,596 | 3/1986 | Slat ........................................ 215/12.2 |
| 4,601,926 | 7/1986 | Jabarin et al. ..................... 215/12.1 X |
| 4,646,925 | 3/1987 | Nohara ............................... 215/12.1 X |
| 4,741,936 | 5/1988 | Nohara et al. ..................... 215/12.2 X |
| 4,743,479 | 5/1988 | Nakamura et al. ................ 215/12.2 X |
| 4,764,403 | 8/1988 | Ajmera ............................... 215/12.2 X |
| 4,818,575 | 4/1989 | Hirata et al. ....................... 215/12.2 X |
| 4,868,026 | 9/1989 | Shimizu et al. .................... 215/12.2 X |
| 4,910,054 | 3/1990 | Collette et al. .................... 215/12.1 X |
| 4,923,723 | 5/1990 | Collette et al. .................... 215/12.2 X |
| 4,979,631 | 12/1990 | Krishnaukumar et al. ............ 215/12.2 |
| 5,064,080 | 11/1991 | Young et al. ............................ 215/375 |
| 5,102,705 | 4/1992 | Yammoto et al. .................. 264/532 X |
| 5,139,162 | 8/1992 | Young et al. ............................ 215/375 |
| 5,287,978 | 2/1994 | Young et al. ............................ 215/375 |
| 5,344,045 | 9/1994 | Richter et al. ..................... 215/12.2 X |
| 5,443,766 | 8/1995 | Slat et al. ............................. 264/513 X |
| 5,599,598 | 2/1997 | Valyi .................................. 215/12.2 X |

Primary Examiner—Sue A. Weaver
Attorney, Agent, or Firm—Brooks & Kushman P.C.

[57] ABSTRACT

A plastic blow molded container (10) includes a hollow body portion (11), an upper dispensing end (14) having a dome (15) and spout (16), and a lower freestanding base (18). The container includes a main layer (19) of virgin polyethylene terephthalate that defines the upper dispensing end (14) and partially defines the hollow body portion (11) and the lower freestanding base (18), and the container also includes a gas barrier liner (20) that is located inside of the main layer (19) defining an inner container surface (20a) and that cooperates with the main layer (19) to define the freestanding base (18) and at least a portion of the body portion (11). The gas barrier liner (20) has an upper end (21) located below the dispensing end (14) and has a wall thickness that is less than 0.25 of the adjacent wall thickness of the polyethylene terephthalate main layer (19). The freestanding base (18) preferably has a central hub (22) as well as hollow legs (23) and curved ribs (24) positioned about the hub in an alternating relationship.

8 Claims, 4 Drawing Sheets

PLASTIC BLOW MOLDED CONTAINER

TECHNICAL FIELD

This invention relates to a plastic blow molded container.

BACKGROUND ART

Plastic blow molding of containers is conventionally performed by providing a hot plastic parison either from extruded plastic or as a preform which is usually injection molded from plastic. Usually, such preforms are composed of a single type of plastic that is injected into a mold through a single port. However, there have also been attempts to provide conduction of more than one plastic into a mold so as to provide different layers of plastic.

U.S. Pat. No. 3,878,282 to Bonis et al. discloses a process for molding multi-layer articles that are specifically disposed as a preform-type parison with different layers. The process involved is performed by injection molding the different layers within different molds while mounted on the same inner mandrel during the injection of each layer.

U.S. Pat. No. 4,307,137 to Ota et al. discloses a method for forming an optical design pattern in polyethylene terephthalate articles which are specifically disclosed as a blow molding preform having inner and outer members with the inner member having an open end defining a thread closure and with the outer member having a junction with the inner member toward a closed end of the preform from the thread closure.

U.S. Pat. No. 4,391,861 to Nilsson discloses a preform of a thermoplastic and has a two-part interfitted construction and at least one intermediate layer that functions as a gas barrier, and also discloses that the outer part may be previously used and reprocessed material.

U.S. Pat. No. 4,646,925 to Nohara discloses a multi-layer preform for draw-blow forming a bottle which has inner and outer layers with a junction that is located toward a closed end of the preform from a closure thread at an open end of the preform. The preform also includes a gas barrier intermediate the inner and outer layers.

U.S. Pat. No. 5,102,705 discloses a bottle made of polyethylene naphthalate resin produced by highly stretching a preform in a manner that is disclosed as limiting gas permeability and x-ray transmission.

Reusable glass bottles for holding pressurized beverages have been substantially replaced by plastic blow molded bottles. Such plastic blow molded bottles were initially manufactured with a hemispherically shaped lower end so as to withstand the internal pressure involved, and this lower end was received within an injection molded base cup for supporting the bottle. More recently, such plastic blow molded containers have been manufactured with freestanding base structures such as disclosed by U.S. Pat. No. 5,064,080 Young et al, U.S. Pat. No. 5,139,162 Young et al and U.S. Pat. No. 5,287,978 Young et al.

U.S. Pat. No. 3,717,544 Valyl, U.S. Pat. No. 3,719,735 Valyl and U.S. Pat. No. 4,067,944 Valyl disclose multi-layer blow molded containers made from preforms having an inner layer provided by a liner about which an outer layer is formed by injection molding. The U.S. Pat. No. 3,717,544 Valyl patent discloses the liners as being made by a thermoforming process wherein a vacuum is applied to a female mold to deform a heated plastic sheet to the shape of the mold.

U.S. Pat. No. 5,443,766 Slat et al discloses a multi-layer preform used for plastic blow molding and provided with an inner layer of polyethylene naphthalate that is thermoformed to function as a gas barrier.

Thermoforming of liners for blow molding preforms is more easily performed in connection with making large mouth containers rather than spout type containers where a dispensing spout projects upwardly from an upper dome that extends upwardly and inwardly from the container body portion. This is because the ratio of the height of the preform over the open diameter is much smaller for large mouth preforms than is the case for spout type preforms. For many applications, spout containers cannot be thermoformed to provide a liner because the height of the preform is too great in comparison with the open diameter such that the material even when heated cannot be stretched enough to form the spout type preform liner.

The dominant gas barrier commercially utilized at the present time to prevent gas transmission through blow molded containers is polyethylene vinyl alcohol (EVOH) which may be dipped, sprayed or brushed as well as coinjected with plastic resin. One disadvantage of EVOH is that it must be fully enveloped by the plastic of the preform or it will tend to draw moisture from the atmosphere and thereby loses its ability to function in preventing gas transmission through the container.

DISCLOSURE OF INVENTION

An object of the present invention is to provide an improved plastic blow molded container.

In carrying out the above object, a plastic blow molded container constructed in accordance with the invention includes a body portion that extends vertically and has upper and lower extremities. An upper dispensing end of the container is located above the upper extremity of the body portion and includes an upper dome extending inwardly and upwardly from the body portion. The upper dispensing end also includes a dispensing spout that extends upwardly from the upper dome and has a closure retainer. A lower freestanding base of the container closes the lower extremity of the body portion and supports the container in an upright position on a suitable horizontal support surface. The container includes a main layer of virgin polyethylene terephthalate that defines the upper dispensing end and partially defines the hollow body portion and the lower freestanding base. The container also includes a gas barrier liner that is located inside of the main layer and defines an inner surface of the container. The gas barrier liner cooperates with the main layer to define the freestanding base and at least a portion of the body portion. The gas barrier liner has an upper end located below the upper dispensing end of the container, and the gas barrier liner has a wall thickness that is less than 0.25 of the adjacent wall thickness of the polyethylene terephthalate main layer.

The gas barrier liner with a lesser height than the entire container can be thermoformed prior to injection molding of the main layer of virgin polyethylene terephthalate around the liner to provide the preform that is blow molded as the container. This gas barrier liner when made as in one embodiment from polyethylene naphthalate has five times better barrier properties to the transmission of carbon dioxide so as to increase shelf life when the container is used to store pressurized carbonated beverages. Also, the polyethylene naphthalate has good resistance to flow at elevated temperatures such that it permits hot filling and also strengthens the lower freestanding base.

In the preferred construction disclosed, the freestanding base includes a central hub as well as hollow legs and curved ribs positioned around the hub in an alternating relationship such that the legs support the container upright on the support surface. The polyethylene naphthalate liner has particular utility in strengthening this construction of the base which is particularly important when the container filled with carbonated beverages is subjected to heat such as during storage in a hot warehouse or elsewhere.

As disclosed, the polyethylene naphthalate liner has a wall thickness that is in the range of 0.05 to 0.15 of the adjacent wall thickness of the polyethylene terephthalate main layer.

In another embodiment, the gas barrier liner includes an inner thermoformed layer and an outer thin layer of EVOH sealed between the inner thermoformed layer of the liner and the container main layer made of polyethylene terephthalate.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
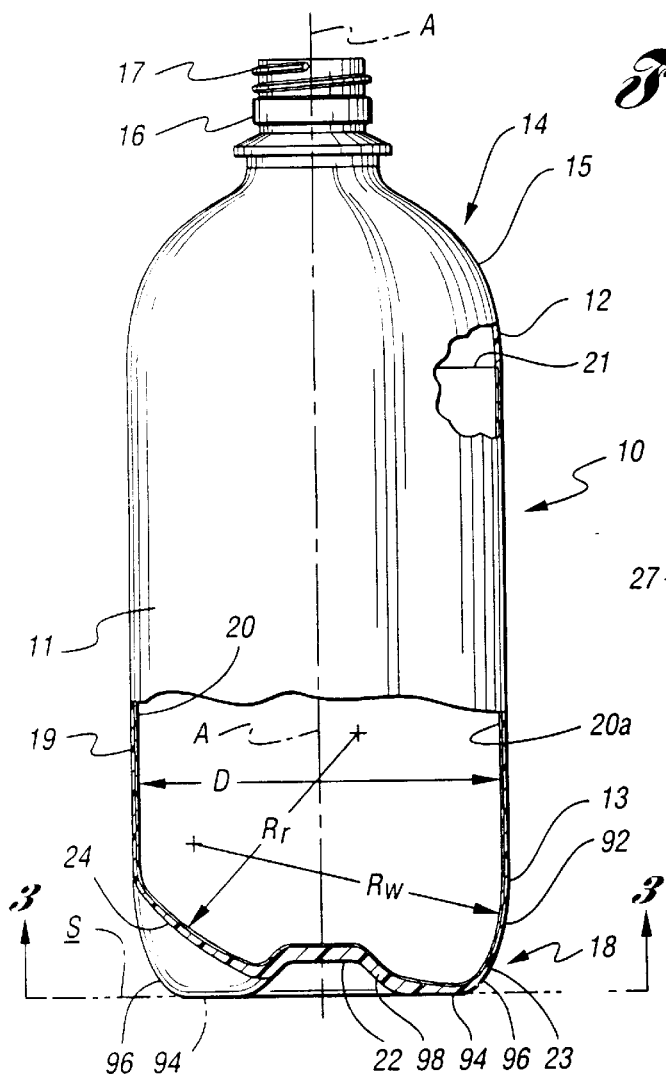
FIG. 1 is an elevational view partially broken away in section of one embodiment a biaxially oriented plastic blow molded container of a multi-layer construction in accordance with the present invention.
Figure 3:
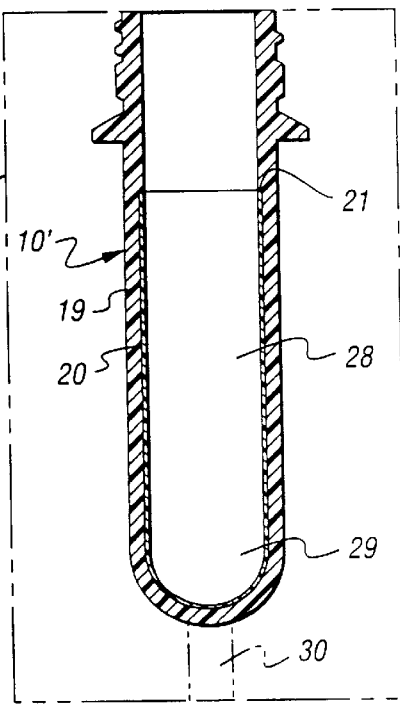
FIG. 3 is a bottom plan view of the container taken along the direction of line 3—3 in FIG. 1 to illustrate the construction of its lower freestanding base.
Figure 3:
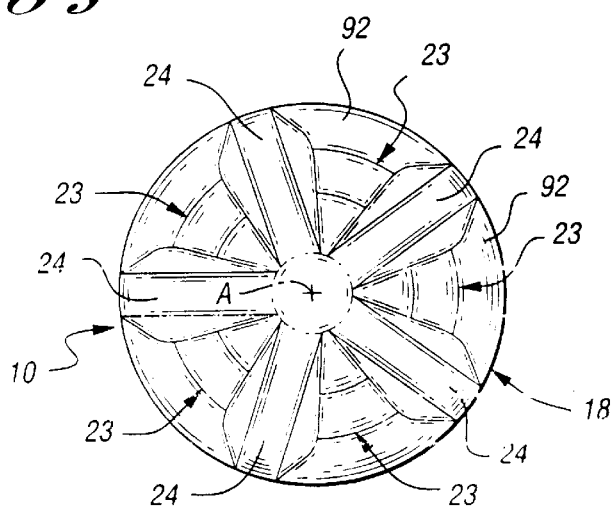

With reference to FIG. 1 of the drawings, a multi-layer blow molded container indicated by 10 is constructed in accordance with the present invention. The container 10 includes a hollow body portion 11 that has upper and lower extremities 12 and 13, respectively. This body portion 11 extends vertically between its upper and lower extremities with a round construction about a central vertical axis A as illustrated in FIG. 3. The container 10 has an upper dispensing end 14 located above the upper extremity 12 of the body portion 11 and including an upper dome 15 extending inwardly and upwardly therefrom with a generally hemispherical shape. The upper dispensing end 14 also includes a dispensing spout 16 that extends upwardly from the upper dome 15 and has a closure retainer 17 for securing an unshown closure cap that closes the container after its filling and that is removed to provide dispensing of the container contents through the open spout.

With reference to both FIGS. 1 and 3, a lower freestanding base 18 of the container closes the lower extremity 13 of the body portion 11 and supports the container in an upright position on a suitable horizontal support surface S.

Figure 2:
FIG. 2 is a partially broken away elevational view of a multi-layer preform that is constructed to provide blow molding of the container of this invention.
Figure 2A:
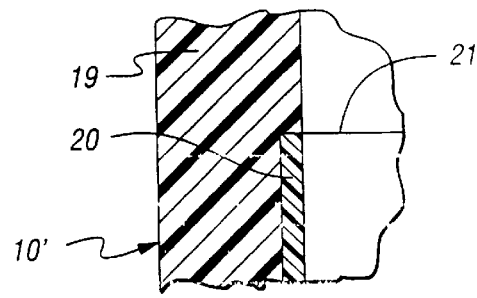
FIG. 2a is a partial view of a portion of FIG. 1 but taken at an enlarged scale to further illustrate its construction.

As illustrated in FIGS. 1, 2 and 2a, the container 10 includes a main layer 19 of virgin polyethylene terephthalate that defines the upper dispensing end 14 and partially defines the hollow body portion 11 and the lower freestanding base 18. The container also includes a gas barrier liner 20 that is located inside of the main layer 19 and defines an inner surface 20a of the container as shown in FIG. 1. The gas barrier liner 20 cooperates with the main layer 19 to define the freestanding base 18 and at least a portion of the body portion 11. In this embodiment, the gas barrier liner 20 is polyethylene naphthalate. The gas barrier liner 20 has an upper end 21 located below the upper dispensing end 14 of the container and has a wall thickness that is less than 0.25 of the adjacent wall thickness of the polyethylene terephthalate main layer 19.

The container 10 illustrated in FIGS. 1 and 3 is blow molded from the preform 10' illustrated in FIG. 2. This preform 10' has a shorter height than the final container and is axially stretched in the vertical direction during the blow molding to provide biaxial orientation that strengthens the resultant container. As illustrated, the blow molding is performed to provide the freestanding base 18 with a construction that includes a central hub 22 and also includes hollow legs 23 and curved ribs 24 positioned around the hub in an alternating relationship such that the legs support the container upright on the support surface S and the ribs strengthen the base so that it is capable of withstanding internal pressure.

As mentioned above and illustrated in FIGS. 1 and 2, the polyethylene naphthalate liner 20 is located inside the main layer 19 of polyethylene terephthalate. This polyethylene naphthalate liner 20 has a wall thickness that is in the range of about 0.05 to 0.15 of the adjacent wall thickness of the polyethylene terephthalate main layer 19. Specifically, the blow molded container 10 will normally have a wall thickness that is nominally twelve or thirteen thousandths of an inch thick and the gas barrier liner 20 will have a thickness that is about 0.6 thousandths of an inch to 2 thousandths of an inch thick with the rest of the wall thickness being the main layer 19 of polyethylene terephthalate. Even though the polyethylene naphthalate is relatively thin in comparison to the polyethylene terephthalate, it has approximately five times the resistance to gas transmission of carbon dioxide such that the container has a greater shelf life.

As is hereinafter more fully described, the barrier liner 20 of polyethylene naphthalate is initially thermoformed in preparation for making the multi-layer preform 10' that is blow molded as container 10. The preform 10' is made by inserting the thermoformed inner liner 20 as shown in FIG. 2 into an injection mold 27 having a core pin 28 whose distal end 29 is located adjacent the area of the preform that eventually becomes the central hub 22 of the freestanding base 18 of the container 10 shown in FIG. 1. The injection mold 27 has an injection port 30 through which the polyethylene terephthalate resin is injected to provide the outer main layer 19 adjacent the core pin distal end 29. As a result of the process by which the inner liner 20 is thermoformed, the closed end of the liner adjacent this core pin distal end 29 has substantially the same thickness as the rest of the liner such that the liner does not provide increased insulation from the core pin and a consequent elevated temperature for a substantial period that can cause crystallinity in the liner and the resultant blow molded container.

Figure 4:
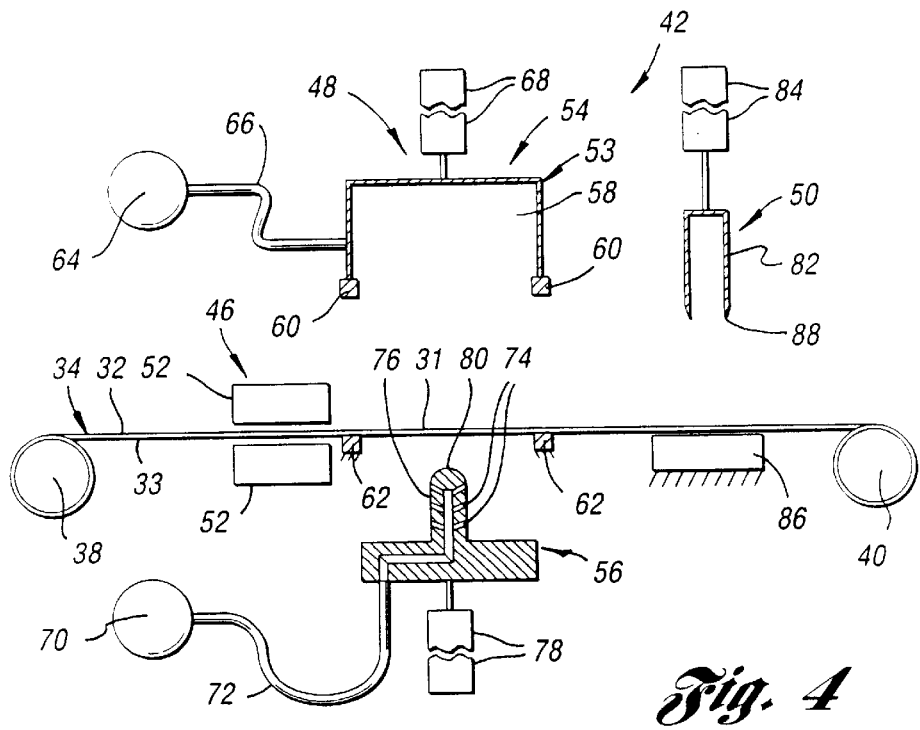
FIG. 4 is an elevational view illustrating apparatus for thermoforming a gas barrier liner of the preform, and the apparatus is shown at an initial stage of a cycle of operation.
Figure 4A:
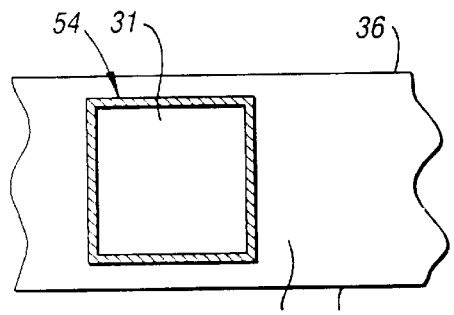
FIG. 4a is a partial plan view taken in section through a thermoforming section of the apparatus.
Figure 9:
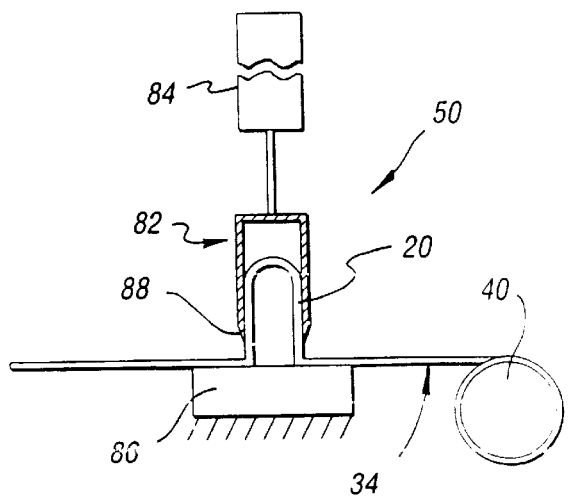
FIG. 9 is a partial view illustrating a trimming station where the preform liner is cut from the rest of a sheet of resin from which it is formed.
Figure 10:
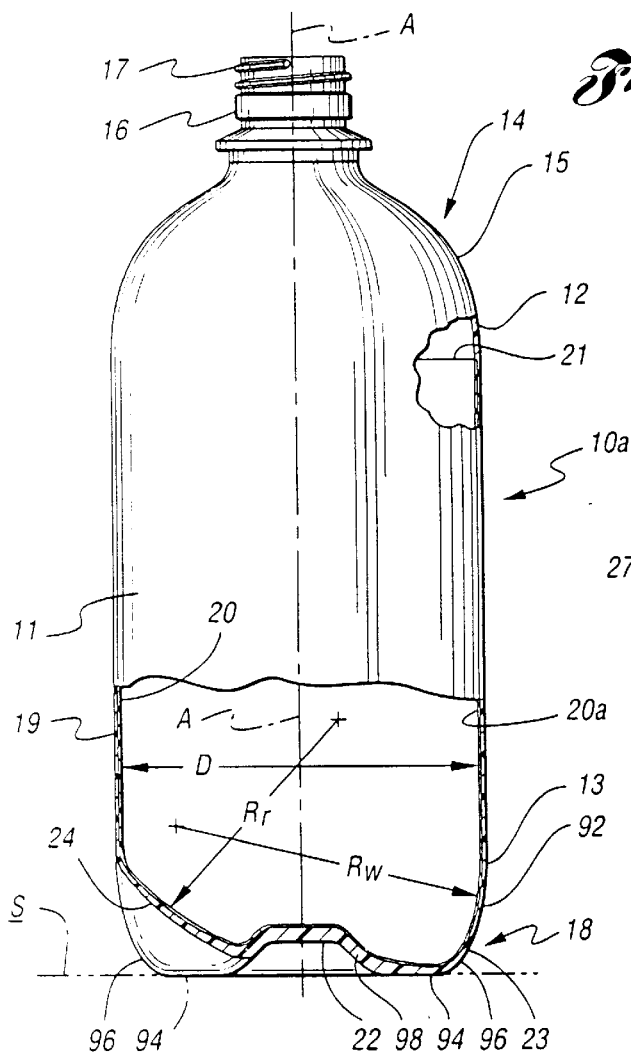
FIG. 10 is an elevational view broken away in section similar to FIG. 1 but illustrating another embodiment of a biaxially oriented plastic blow molded container of a multi-layer construction in accordance with the present invention.

With reference to FIGS. 4 and 4a, the inner liner is thermoformed from a confined area 31 to shape first and second oppositely facing surfaces 32 and 33 (FIG. 4) of a sheet 34 of polyethylene naphthalate resin between its edges 36 (FIG. 4a). This resin sheet 34 as shown in FIG. 4 is provided from a supply roll 38 and moved toward the right therefrom to a scrap roll 40 through a preform liner manufacturing system 42. This preform liner manufacturing system 42 includes a heating station 46, a thermoforming station 48, and a trimming station 50 at which the completed liner is trimmed from the rest of the sheet 34 as illustrated in FIG. 9.

With continuing reference to FIG. 4, the heating station 46 includes at least one heater 52 and preferably includes a pair of opposed heaters 52 as illustrated between which the resin sheet 34 is moved for heating. These heaters 52 may be of any suitable type such as gas, electric resistance etc. to provide sufficient heating of the resin sheet 34 for softening in preparation for the thermoforming.

With continuing reference to FIG. 4, the thermoforming station 48 is located downstream from the heating station 46 and includes apparatus 53 for making the preform liner described above. This apparatus 53 includes a vacuum enclosure 54 located on one side of the resin sheet 34 adjacent its first surface 32 as well as including a male vacuum mold 56 located on the other side of the resin sheet adjacent its second surface 33. As is hereinafter more fully described, the vacuum enclosure 54 cooperates with the male vacuum mold 56 to provide the thermoforming of the preform liner 20 previously described within the confined area 31 of the resin sheet 34.

Figure 5:
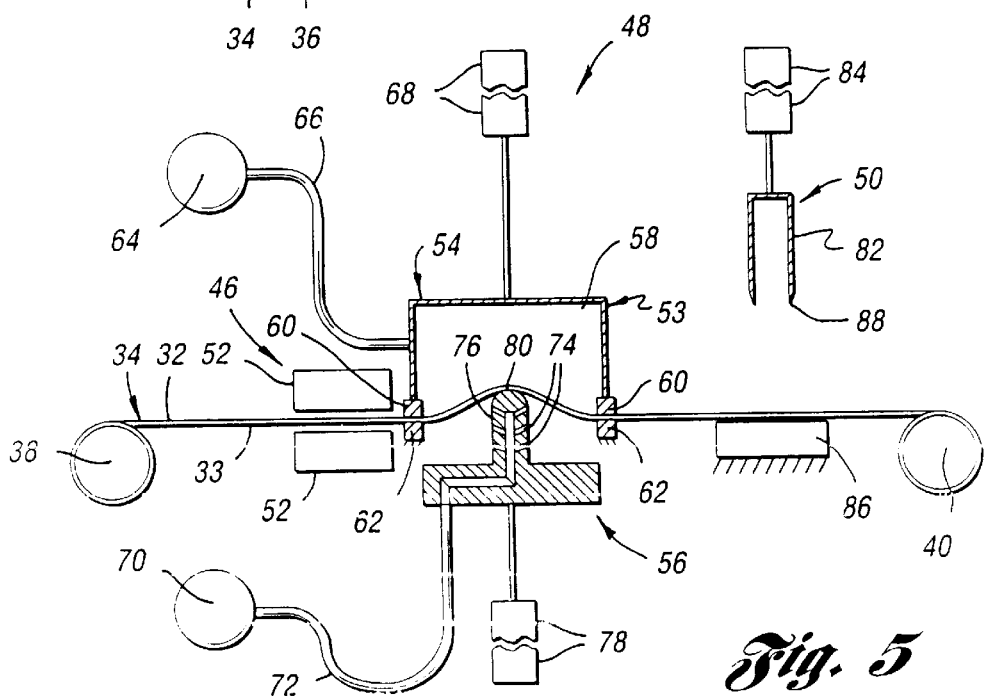
FIG. 5 is a view similar to FIG. 4 but showing the apparatus at a later stage of the thermoforming cycle.

The vacuum enclosure 54 of the thermoforming apparatus 53 as shown in FIG. 4 is located above the resin sheet 34 and defines a vacuum chamber 58 as well as having a lower peripheral seal 60. The resin sheet 34 is movable over a stationary peripheral support 62 that conforms in shape to the lower seal 60 of the vacuum enclosure. A vacuum source 64 is communicated by a flexible conduit 66 with the vacuum chamber 58 to draw a vacuum within the vacuum chamber 58 during the thermoforming operation. An actuator 68 of any suitable type moves the vacuum enclosure 54 vertically toward and away from the stationary peripheral support 62 such that its lower seal 60 moves into and out of sealed engagement with the heated sheet of resin 34. A vacuum is drawn as shown in FIG. 5 within the vacuum chamber 58 such that within the confined area 31 the first surface 32 of the resin sheet 34 is formed to a convex shape and the second surface 33 is formed to a concave shape.

As shown in FIG. 4, the male vacuum mold 56 of the thermoforming station 48 is located below the resin sheet 34 on the opposite side thereof from the vacuum enclosure 54 and includes a vacuum source 70 that is communicated by a suitable flexible conduit 72 to passages 74 of the male mold 56. These passages 74 extend to the male mold surface 76 which conforms to the inner surface of the formed liner 20 shown in FIG. 2. The male vacuum mold 56 with reference back to FIG. 4 includes an actuator 78 for providing movement thereof toward the resin sheet 34 as shown in FIG. 5. A distal end 80 of the mold surface 76 engages the concave second surface 33 of the resin sheet 34 as shown during the thermoforming operation. A vacuum is sequentially drawn through the male vacuum mold 56 as is hereinafter described in connection with FIGS. 6–8 to form the resin sheet 34 to the shape of the mold surface 76 and thereby form the liner for the blow molding preform as previously described. The curved shape of the resin sheet 34 within the confined area of the vacuum enclosure 54 as shown in FIG. 5 provides preforming before the forming provided by the male vacuum mold 56 and results in a thinner liner adjacent the distal end 80 of the mold surface 76. Having the thinner liner as previously mentioned prevents the liner from acting as an insulator at its closed end adjacent the injection port when the outer layer of the preform is injection molded. Thus, there is no heat insulating effect that can maintain heat from the injection molded outer layer in a manner that causes crystallinity to the outer layer as well as to the liner. This lack of crystallinity thus provides a stronger more effective blow molded container.

Figure 6:
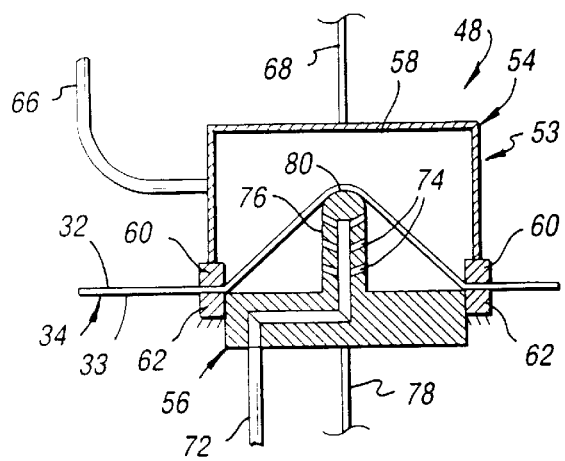
FIG. 6 is a partial view of a FIG. 5 but showing the apparatus at a still further stage of the thermoforming cycle.
Figure 7:
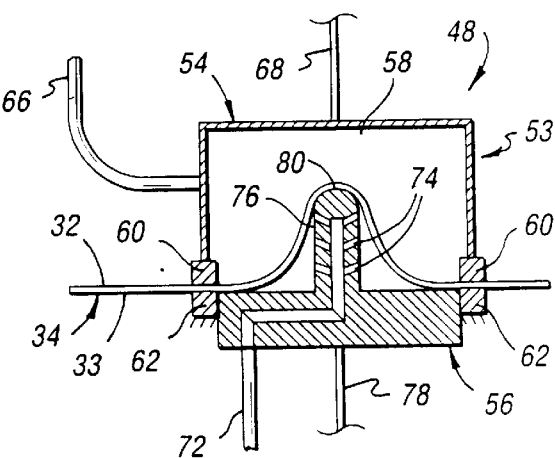
FIG. 7 is a partial view of the apparatus similar to FIG. 6 but at a yet still further stage of the thermoforming cycle.
Figure 8:
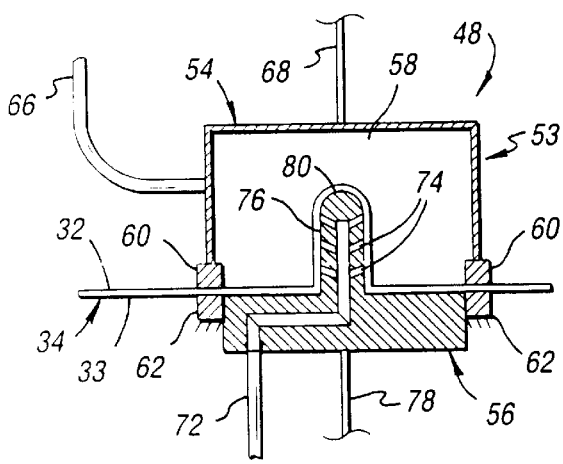
FIG. 8 is a view similar to FIG. 7 but showing the apparatus after completion of the thermoforming cycle to provide a preform liner for blow molding.

With reference to FIG. 6, the vacuum provided within the vacuum chamber 58 of the vacuum enclosure 54 is maintained at the first surface 32 of the heated sheet 34 of resin after the initial engagement of the male vacuum mold 56 with the second surface 33 thereof and while the male vacuum mold is thereafter moved to form the heated sheet of resin as shown in FIG. 6. The movement of the male vacuum mold under the operation of actuator 78 is then terminated and the vacuum drawn at the first surface 32 of the heated sheet 34 of resin is terminated within the vacuum chamber 58 of the vacuum enclosure 54. This termination of the vacuum within the vacuum chamber 58 causes the resin sheet 34 to further deform to the shape of the male vacuum mold 56 as shown in FIG. 7 even before the vacuum is drawn through the male vacuum mold. Drawing of the vacuum through the male vacuum mold 56 by the conduit 72 communicated with the mold passages 74 conforms the resin sheet to the mold surface 76 as shown in FIG. 8.

With reference to FIG. 9, the trimming station 50 includes a trimming member 82 moved by an actuator 84 toward and away from a lower support surface 86 over which the formed liner 20 is moved with the rest of the resin sheet 34 downstream from the thermoforming station described above. Downward movement of the trimming member 82 under the operation of actuator 84 engages a lower sharpened edge 88 thereof with the resin sheet 34 around the liner 20 to cut the liner from the rest of the resin sheet 34 which then is received by the scrap roll 40 as previously described.

After the trimming operation illustrated in FIG. 9, the liner 24 is transferred to the injection mold 27 shown in FIG. 2 as previously described for injection molding of the outer main layer 19 to complete the manufacturing of the blow molding preform prior to blow molding thereof to provide the multi-layer blow molded container 10.

With reference to FIGS. 1 and 3, the freestanding base 18 of the container 10 preferably has each leg 23 thereof provided with an outer wall 92 with a curved shape of a radius of curvature $R_w$ greater than 0.75 of the diameter D of the container body portion 11. Furthermore, each curved rib 24 of the freestanding base 18 has a radius of curvature $R_r$ greater than about 0.6 of the diameter D of the body portion and also preferably has the center of radius of curvature located on the opposite side of the central axis A from the associated rib. In addition, each leg 23 has a lower flat foot 94 and an abruptly curved junction 96 that connects the flat foot with the outer wall 92. Furthermore, each leg 23 has an inner connecting portion 98 that extends upwardly in an inclined orientation from the inner extremity of the associated flat foot 94 to the hub 22. The hub 22, the connecting portion 98 and the inner extremity of the foot 94 have a much greater wall thickness than the rest of the container since there is less stretching thereof during the blow molding such that these parts of the container are relatively unoriented compared to the rest of the container. Nevertheless, the construction described enables the bottle to withstand internal pressure. In this regard, it should be mentioned that the curved ribs 24 may have lower inner ends that are of a greater cross-sectional width than the upper outer ends thereof so that there is a greater amount of material, where the container wall is unoriented and of lesser strength, for providing connection of the curved ribs and thus strengthening the freestanding base construction.

Figure 11:
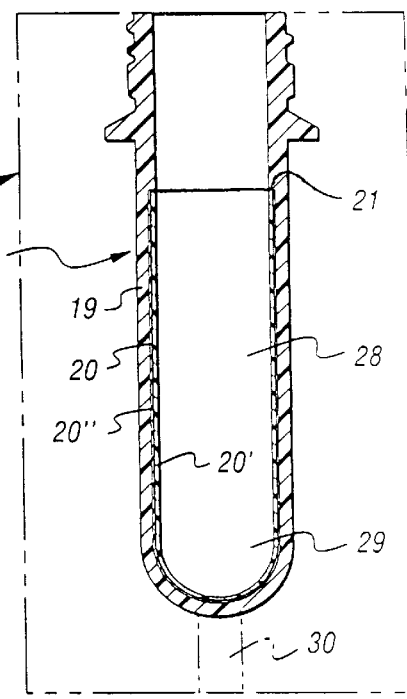
FIG. 11 is a partially broken away elevational view of a multi-layer preform that is constructed to provide blow molding of the container shown in FIG. 10.
Figure 12:
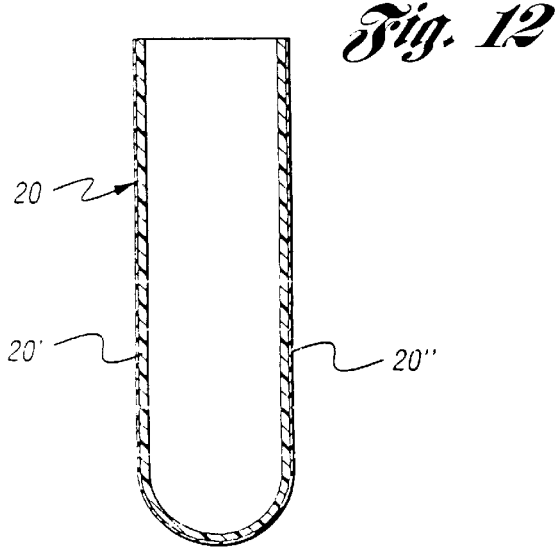
FIG. 12 is a view that further illustrates the construction of the gas barrier liner of the preform illustrated in FIGS. 11 and 11a for use in blow molding the container of FIG. 10.
Figure 11A:
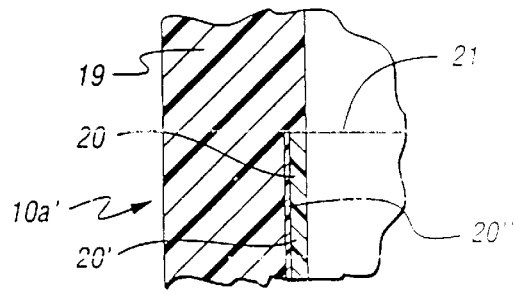
FIG. 11a is a partial view of a portion of FIG. 11 but taken at an enlarged scale to further illustrate its construction.

With reference to FIGS. 10, 11, 11a and 12, another embodiment of a multi-layer blow molded container constructed in accordance with the present invention is generally indicated by 10a and has the same construction as the previously described embodiment of FIGS. 1–9 except as will be noted such that like reference numerals are applied to like components thereof and much of the description is the same and thus need not be repeated. However, with this embodiment of the container, the preform 10a' illustrated in FIGS. 11, 11a and 12 has a thermoformed inner layer 20' that is made in the same manner previously described in connection with FIGS. 4–9 but is not necessarily made of polyethylene naphthalate even though it is preferable to do so in order to maintain the gas barrier properties and the base resistance to heat as previously described. Nevertheless, other plastic resins can be thermoformed to make the inner layer 20' of the gas barrier liner 20 in this embodiment such as polyethylene terephthalate. After manufacturing of the inner layer 20' as illustrated in FIG. 12, its exterior is coated with an outer thin layer 20" of EVOH. Subsequent injection molding of the preform 10a as illustrated in FIG. 11 thus seals the EVOH layer 20" between the inner layer 20' of the liner 20 and the main layer 19 of polyethylene terephthalate. Such a layer of EVOH sealed as illustrated can provide twenty times the resistance to gas passage as polyethylene terephthalate.

The gas barrier liner 20 illustrated in FIGS. 10, 11, 11a and 12 has a wall thickness like the previously described embodiment that is in the range of 0.05 to 0.15 of the adjacent wall thickness of the polyethylene terephthalate main layer 19. Specifically, the blow molded container 10a will normally have a wall thickness that is nominally twelve or thirteen thousandths of an inch thick and the gas barrier liner 20 will have a thickness that is about 0.6 thousandths of an inch to 2 thousandths of an inch thick with the rest of the wall thickness being the main layer 19 of polyethylene terephthalate. Even though the gas barrier liner 20 is relatively thin in comparison to the polyethylene terephthalate, the EVOH provides it with approximately 20 times the resistance to gas transmission of carbon dioxide such that the container has a greater shelf life. The gas barrier liner 20 has an even greater resistance to gas transmission when its inner layer 20' is thermoformed from polyethylene naphthalate.

While the best modes for carrying out the invention have been described in detail, those familiar with the art to which this invention relates will recognize various alternative designs and embodiments for carrying out the invention as defined by the following claims.

What is claimed is:

1. A plastic blow molded container comprising:

a hollow body portion that extends vertically and has upper and lower extremities;

an upper dispensing end located above the upper extremity of the body portion and including an upper dome extending inwardly and upwardly therefrom, and the upper dispensing end also including a dispensing spout that extends upwardly from the upper dome and has a closure retainer;

a lower freestanding base that closes the lower extremity of the body portion and supports the container in an upright position on a suitable horizontal support surface;

the container including a main layer of virgin polyethylene terephthalate that defines the upper dispensing end and partially defines the hollow body portion and the lower freestanding base; and the container also including a gas barrier liner that is located inside of the main layer and defines an inner surface of the container, the gas barrier liner cooperating with the main layer to define the freestanding base and at least a portion of the body portion, the gas barrier liner having an upper end located below the upper dispensing end of the container, and the gas barrier liner having a wall thickness that is less than 0.25 of the adjacent wall thickness of the polyethylene terephthalate main layer.

2. A plastic blow molded container as in claim 1 wherein the freestanding base includes a central hub as well as hollow legs and curved ribs positioned around the hub in an alternating relationship such that the legs support the container upright on the support surface.

3. A plastic blow molded container as in claim 1 wherein the liner is polyethylene naphthalate.

4. A plastic blow molded container as in claim 3 wherein the polyethylene naphthalate liner has a wall thickness that is in the range of 0.05 to 0.15 of the adjacent wall thickness of the polyethylene terephthalate main layer.

5. A plastic blow molded container as in claim 1 wherein the gas barrier liner includes an inner thermoformed layer and an outer thin layer of EVOH sealed between the inner thermoformed layer of the liner and the container main layer of polyethylene terephthalate.

6. A plastic blow molded container comprising:

a hollow body portion that extends vertically and has upper and lower extremities;

an upper dispensing end located above the upper extremity of the body portion and including an upper dome extending inwardly and upwardly therefrom, and the upper dispensing end also including a dispensing spout that extends upwardly from the upper dome and has a closure retainer;

a lower freestanding base that closes the lower extremity of the body portion and supports the container in an upright position on a suitable horizontal support surface, and the freestanding base including a central hub as well as hollow legs and curved ribs positioned around the hub in an alternating relationship such that the legs support the container upright on the support surface;

the container including a main layer of virgin polyethylene terephthalate that defines the upper end and partially defines the hollow body portion and the lower freestanding base; and the container also including a gas barrier liner of polyethylene naphthalate that is located inside the main layer of polyethylene terephthalate and defines an inner surface of the container, the polyethylene naphthalate liner cooperating with the polyethylene telephthalate main layer to define the freestanding base and at least a portion of the body portion, the polyethylene naphthalate liner having an upper end located below the upper dispensing end of the container, and the polyethylene naphthalate liner having a wall thickness that is less than 0.25 of the adjacent wall thickness of the polyethylene terephthalate main layer.

7. A plastic blow molded container comprising:

a hollow body portion that extends vertically and has upper and lower extremities;

an upper dispensing end located above the upper extremity of the body portion and including an upper dome extending inwardly and upwardly therefrom, and the upper dispensing end also including a dispensing spout that extends upwardly from the upper dome and has a closure retainer;

a lower freestanding base that closes the lower extremity of the body portion and supports the container in an upright position on a suitable horizontal support surface, and the freestanding base including a central hub as well as hollow legs and curved ribs positioned around the hub in an alternating relationship such that the legs support the container upright on the support surface;

the container including a main layer of virgin polyethylene terephthalate that defines the upper end and partially defines the hollow body portion and the lower freestanding base; and the container also including a gas barrier liner of polyethylene naphthalate that is located inside the main layer of polyethylene terephthalate and defines an inner surface of the container, the polyethylene naphthalate liner cooperating with the polyethylene telephthalate main layer to define the freestanding base and at least a portion of the body portion, the polyethylene naphthalate liner having an upper end located below the upper dispensing end of the container, and the polyethylene naphthalate liner having a wall thickness that is in the range of 0.05 to 0.15 of the adjacent wall thickness of the polyethylene terephthalate main layer.

8. A plastic blow molded container comprising:

a hollow body portion that extends vertically and has upper and lower extremities;

an upper dispensing end located above the upper extremity of the body portion and including an upper dome extending inwardly and upwardly therefrom, and the upper dispensing end also including a dispensing spout that extends upwardly from the upper dome and has a closure retainer;

a lower freestanding base that closes the lower extremity of the body portion and supports the container in an upright position on a suitable horizontal support surface, and the freestanding base including a central hub as well as hollow legs and curved ribs positioned around the hub in an alternating relationship such that the legs support the container upright on the support surface;

the container including a main layer of virgin polyethylene terephthalate that defines the upper end and partially defines the hollow body portion and the lower freestanding base; and the container also including a gas barrier liner that has an inner layer that is thermoformed and located inside the main layer of polyethylene terephthalate to define an inner surface of the container, the thermoformed inner layer of the gas barrier liner cooperating with the main layer of polyethylene terephthalate to define the freestanding base and at least a portion of the body portion, the gas barrier liner including an outer thin layer of EVOH sealed between the inner thermoformed layer and the main layer of polyethylene terephthalate, the gas barrier liner having an upper end located below the upper dispensing end of the container, and the gas barrier liner having a wall thickness that is less than 0.25 of the adjacent wall thickness of the polyethylene terephthalate main layer.

\* \* \* \* \*